(12) United States Patent
Aynes et al.

(10) Patent No.: US 7,857,584 B2
(45) Date of Patent: Dec. 28, 2010

(54) STATOR VANE WITH LOCALIZED REWORKING OF SHAPE, STATOR SECTION, COMPRESSION STAGE, COMPRESSOR AND TURBOMACHINE COMPRISING SUCH A VANE

(75) Inventors: Claire Jacqueline Aynes, Vert Saint Denis (FR); Evelyne Ginette Boutteville, Chennevieres sur Marne (FR); Thierry Jean Maurice Niclot, Savigny sur Orge (FR)

(73) Assignee: SNECMA, Paris (FR)

( * ) Notice: Subject to any disclaimer, the term of this patent is extended or adjusted under 35 U.S.C. 154(b) by 924 days.

(21) Appl. No.: 11/692,726

(22) Filed: Mar. 28, 2007

(65) Prior Publication Data

US 2007/0231131 A1    Oct. 4, 2007

(30) Foreign Application Priority Data

Mar. 30, 2006    (FR) .................................. 06 02741

(51) Int. Cl.
*F01D 1/02* (2006.01)
(52) U.S. Cl. .................................. 415/209.3; 415/209.4
(58) Field of Classification Search .............. 415/209.3, 415/209.4, 210.1; 416/213 R
See application file for complete search history.

(56) References Cited

U.S. PATENT DOCUMENTS

| 2,110,679 A | 3/1938 | Robinson |
| 5,474,419 A | 12/1995 | Reluzco et al. |
| 6,543,998 B1 | 4/2003 | Scharl |

FOREIGN PATENT DOCUMENTS

| DE | 1 200 070 | 9/1965 |
| DE | 199 41 133 C 1 | 12/2000 |
| EP | 1 555 390 A1 | 7/2005 |
| WO | WO 2005/116404 A1 | 12/2005 |

*Primary Examiner*—Edward Look
*Assistant Examiner*—Dwayne J White
(74) *Attorney, Agent, or Firm*—Oblon, Spivak, McClelland, Maier & Neustadt, L.L.P.

(57) ABSTRACT

The invention relates to a novel reworking of a geometric shape of a stator vane in order locally to reduce the stress levels. It proposes a novel type of stator section in which a local reworking of the geometry of the vanes has been performed, this reworking making it possible to reduce the level of stress in the brazed joint connecting the vane to its outer shroud without entailing further aerodynamic engineering. To do that, the invention consists in a progressive and localized increase in the radius at the trailing edge combined with a progressive increase in the thickness of the vane.

12 Claims, 5 Drawing Sheets

STATOR VANE WITH LOCALIZED REWORKING OF SHAPE, STATOR SECTION, COMPRESSION STAGE, COMPRESSOR AND TURBOMACHINE COMPRISING SUCH A VANE

BACKGROUND OF THE INVENTION AND DESCRIPTION OF THE PRIOR ART

The invention relates to the field of turbomachines, particularly turbojet engines, and applies to stator vanes positioned within a compressor.

It relates more precisely to a novel reworking of a geometric shape of the vane in order locally to reduce the stress levels.

In the remainder of the description, the terms "upstream" or "downstream" will be used to denote the positions of the structural elements in relation to one another in the axial direction, taking the gas flow direction as reference point. Likewise, the terms "internal" or "radially internal" and "external" or "radially external" will be used to denote the positions of the structural elements in relation to one another in the radial direction, taking the axis of rotation of the turbomachine as reference point.

A turbomachine comprises one or more compressors delivering pressurized air to a combustion chamber where the air is mixed with fuel an ignited so as to generate hot combustion gases. These gases flow down-stream of the chamber toward one or more turbines which convert the energy thus received in order to rotate the compressor or compressors and thus provide the work required, for example, to power an aircraft.

A compressor, for example a high-pressure compressor, is made up of one or more compression stages each comprising a cascade of fixed vanes, followed by a rotor disk equipped with rotor blades. The cascade of fixed vanes, also known as the stator cascade, may be made up of a collection of angular stator sections, an example of which is illustrated in FIG. 1, each section 1 comprising a plurality of fixed vanes 2 connected by their internal end to an inner shroud 3 and by their external end to an outer shroud 4. The purpose of the stator sections is to straighten the stream of air arriving from the upstream side of the engine in order that this stream arrives on the upstream side of the rotor disk at an appropriate angle.

The vanes 2 are defined by two flanks known respectively as the pressure face 8 and the suction face 9 which form an aerodynamic profile with a leading edge and a trailing edge. The leading edge 6, or LE, is formed where the pressure face and the suction face meet on the upstream side. The trailing edge 7, or TE, is formed where the pressure face and the suction face meet on the downstream side. This aerodynamic profile is very important because it allows the vane to straighten the air stream arriving from the upstream side of the turbomachine as desired. This profile is designed by calculation and represented in the form of radial sections, taken along the vane stacking axis denoted E in the figure, at various heights with respect to the engine axis. The vane formed by these various radial sections is then incorporated between the inner and outer shrouds. The connection between the vane and the shrouds may be made in different ways. The vane and the shrouds may then be assembled by brazing.

For certain aerodynamic profiles, the radius of curvature of the TE is so small, for example of the order of one tenth of a millimeter that this, while the engine is running, leads to an increase in the static stress in the brazed joint between the vane and the outer shroud, on the pressure face side, toward the TE.

The stress level thus reached may prove prohibitive and cause cracks to appear in the joint.

When this type of crack appears, it is known practice for the geometry of the vane to be reworked with a view to reducing the stress level in the cracked zone. This reworking of known type is achieved by increasing the thickness of the vane over all the radial sections and for all or part of the height h of the vane. This type of reworking therefore alters the aerodynamic profile of the vane which means that a new profile needs to be calculated and the mechanical integrity of the new vane, particularly the level of stress reached in the cracked zone, needs to be verified. Several iterations between the aerodynamic engineering and the mechanical engineering are often needed in order to obtain a profile that is satisfactory both from an aerodynamic standpoint and from a mechanical standpoint. This type of modification is cumbersome to perform, lengthy and expensive. In addition, it entails a complete change of vane and has a very great impact on its manufacture.

SUMMARY OF THE INVENTION

The invention allows these problems to be solved by proposing a new type of stator section for which a local reworking of the geometry of the vanes has been performed. This reworking makes it possible to reduce the level of stress in the brazed joint connecting the vane to its outer shroud without entailing further aerodynamic engineering.

Thus, this local reworking is able to guarantee the mechanical integrity of the stator section without having an impact on the aerodynamic profile of the vanes. Iterations between aerodynamic engineering and mechanical engineering are therefore no longer needed, allowing time to be saved hence allowing a faster response to the client's requirement and also a reduction in costs both in terms of design work needed and in terms of manufacture. Indeed, in the case of forged vanes, for example, only local machining of the existing mold will be needed. In addition, this new type of stator is perfectly interchangeable with an old stator without affecting the interfaces between the parts surrounding the stator.

More specifically, the invention relates to a turbomachine stator section comprising at least one stator vane, each stator vane being connected to an inner shroud and to an outer shroud and comprising a radially internal part of height h4, a radially external part of height h1, a pressure face side, a suction face side, a leading edge, a trailing edge, the radially external part, known as the tip, being made up of an intermediate part of height h3 and a connecting part of height h2 which meet, the intermediate part being positioned between the connecting part and the radially internal part, the radially internal part of each vane comprising a first zone connected to the radially external part by a transition zone, each vane being connected to the outer shroud only by its connecting part, its intermediate part being positioned radially inside the outer shroud, the trailing edge having a radius of curvature, connecting the pressure face to the suction face, which increases progressively in the transition zone of the vane, the radius of curvature reaching a maximum where the transition zone and the intermediate part meet then remaining constant in the connecting part.

According to one embodiment of the invention, the radius of curvature of the trailing edge is constant in the first zone of the radially internal part of each vane.

As a preference, the radius of curvature of the trailing edge increases linearly in the transition zone of each vane.

Advantageously, the thickness of the airfoil increases progressively in the transition zone of each vane, on the pressure face side toward the trailing edge.

According to one possible embodiment, the radius of curvature of the trailing edge of the transition zone of each vane increases until it reaches three times the radius of curvature of the trailing edge of the first zone of the radially internal part of the vane.

Advantageously, the transition zone (2d) and the intermediate part (2c) of each vane represent between 0.5 and 2.5% of the total height of the vane and the progressive increase in the thickness of the vane may occur over one third of the length of the chord.

The invention also relates to a compression stage, to a compressor and to a turbomachine all equipped with at least one such stator section.

BRIEF DESCRIPTION OF THE DRAWINGS

The invention will be better understood and other advantages thereof will become more clearly apparent in the light of the description which will follow of one preferred embodiment, given by way of nonlimiting example and made with reference to the attached drawings, in which.

DESCRIPTION OF THE PREFERRED EMBODIMENT

Figure 1:
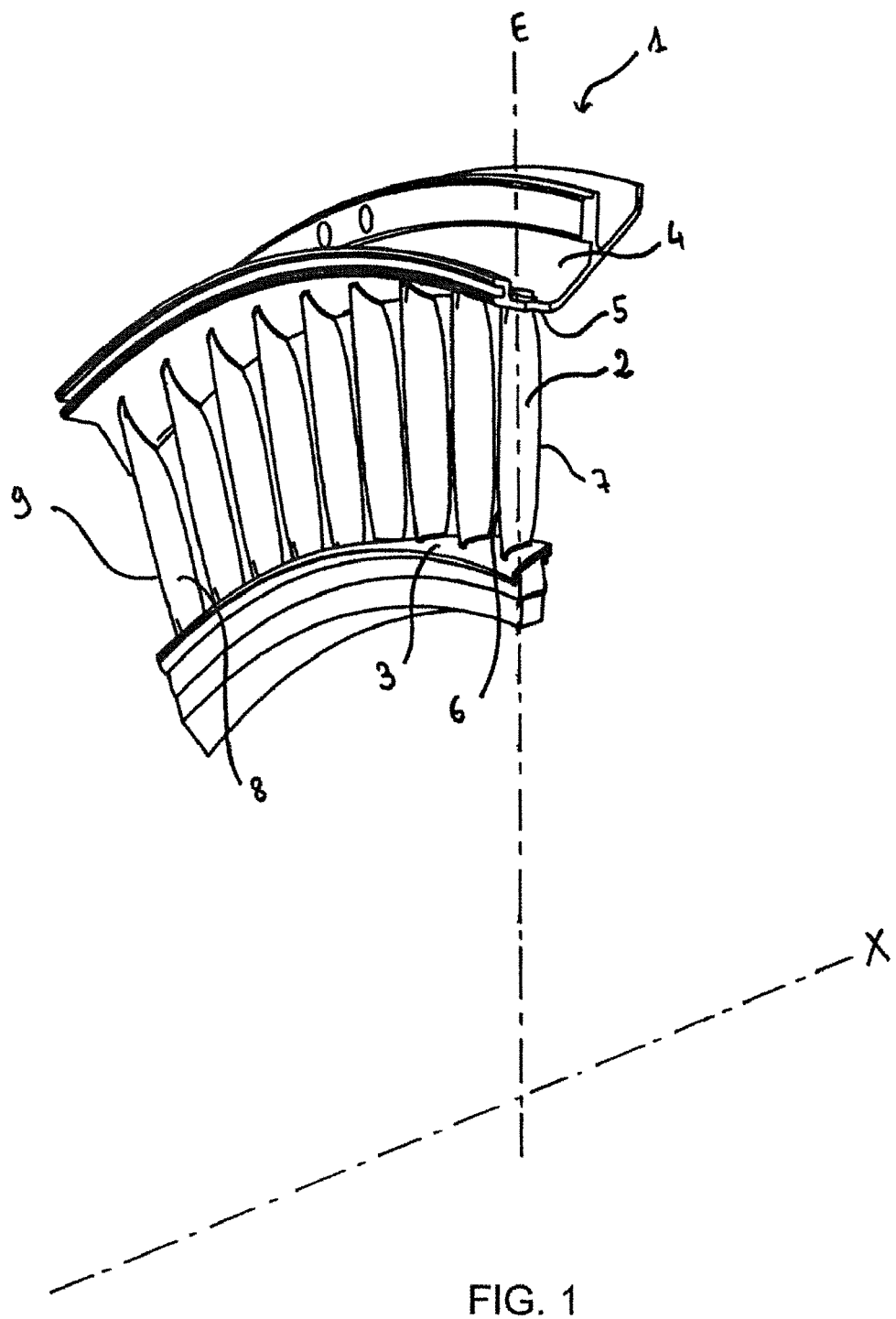
FIG. 1 is a perspective view of a stator section according to the prior art, viewed from the upstream side.

FIG. 1, already described, shows, viewed from the upstream side, a stator section 1 comprising a plurality of vanes 2.

Figure 2:
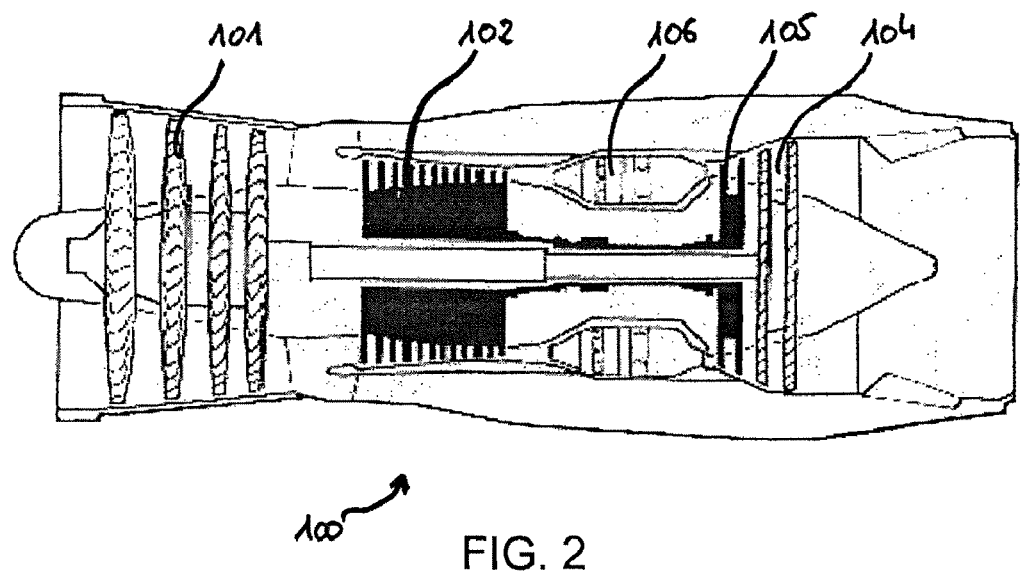
FIG. 2 is a schematic view in cross section of a turbomachine and more specifically of an aero jet engine.

FIG. 2 shows, in cross section, an overall view of a turbomachine 100, for example an aero jet engine, comprising a low-pressure compressor 101, a high-pressure compressor 102, a low-pressure turbine 104, a high-pressure turbine 105 and a combustion chamber 106.

Figure 3:
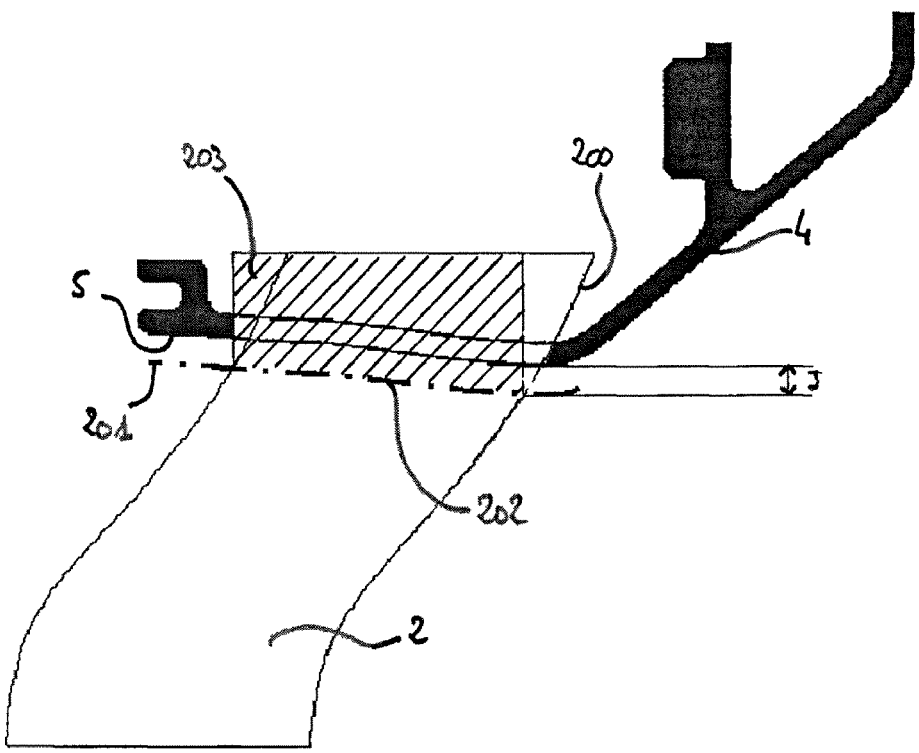
FIG. 3 is a schematic view in cross section of part of a stator section.

FIG. 3 shows, viewed in cross section, a stator section. More specifically, this figure illustrates one example of how the aerodynamic profile 200 of the vanes 2 meet the outer shroud 4. In this example, the vane 2 and the outer shroud 4 meet as follows:

the aerodynamic profile 200 is extended radially beyond the outer shroud. In order to account for combined assembly clearances, the aerodynamic profile 200 is truncated along a surface 201 parallel to the internal face 5 of the outer shroud 4, the surface 201 and the internal face 5 being separated by a distance J equal to the size of the combined assembly clearances. Once the aerodynamic profile 200 has been truncated, the cutting surface 202 thus obtained is projected radially to obtain a cylinder 203 extending slightly above the outer shroud 4. Thus, the end of the vane situated between the cutting surface 202 and the internal face 5 of the outer shroud 4 is a cylinder the generatrices of which are parallel to the stacking axis E of the vane. This type of connection facilitates the drilling of holes in the outer shroud, in which holes the vanes will be positioned.

Figure 4:
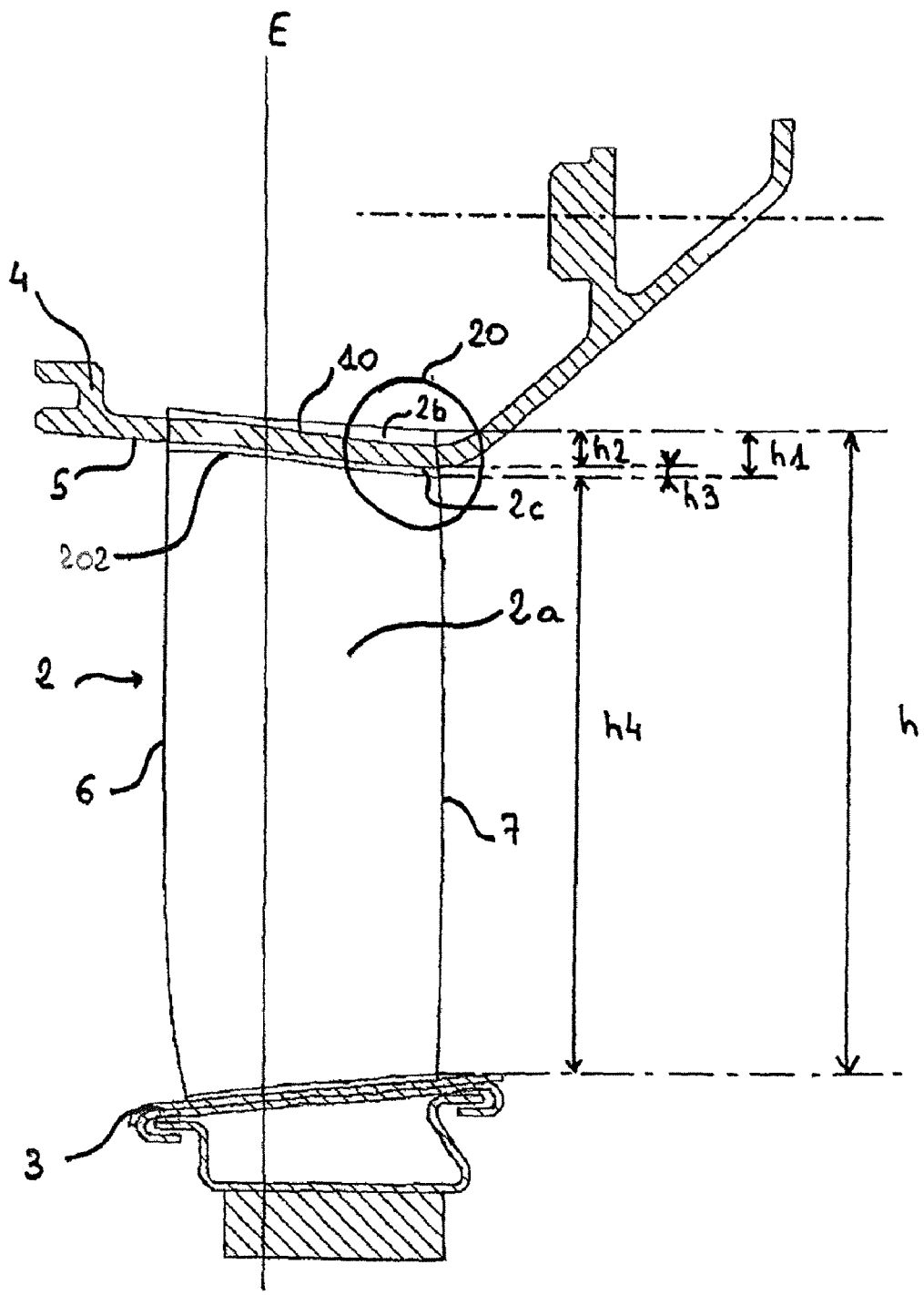
FIG. 4 is a view in cross section of a stator section, on a plane containing the axis X of rotation of the turbomachine, according to the invention.

FIG. 4 shows a stator section, viewed in cross section on a plane containing the axis X of rotation of the turbomachine according to the invention.

The vane 2, of total height h, is made up of a radially external part 10 of height h1 and of a radially internal part 2a of height h4. The radially external part 10, also known as the vane tip, is made up of a connecting part 2b of height h2 and an intermediate part 2c of height h3, with h1=h2+h3.

The vane 2 is set radially in the outer shroud 4 by means of its radially external part 10 and more specifically by virtue of its connecting part 2b. In the example illustrated here the vane 2 and the outer shroud 4 are connected using the method described above. Thus, the radially external part 10 is a cylinder the generatrices of which are parallel to the axis of stacking E of the vane 2. The cut surface 202 corresponds to the boundary between the radially internal 2a and external 10 parts of the vane.

The radially internal part 2a of height h4 stretches between the inner shroud 3 and the cutting surface 202. Its shape is determined by calculation as explained above.

The vane 2 and the outer shroud 4 are assembled by brazing, the brazed joint being created between the outer shroud 4 and the connecting part 2b of height h3 of the vane. When the radius of curvature of the trailing edge 7 is very small, for example of the order of 0.2 mm, a local excess stress may occur in the brazed joint on the pressure face side, toward the TE, and cause cracking. The zone where this possible excess stress occurs corresponds to the zone referenced 20. It is in this zone that the shape of the vane has been reworked.

The height h1 of the radially external part 10 represents between 5% and 10%, preferably 7%, of the total height h of the vane 2; the height h2 of the connecting part 2b represents between 0.5% and 15%, preferably 5.8%, of the total height h; and the height h3 of the intermediate part 2c between 0% and 5%, preferably 1.3%, of the total height h.

Figure 5:
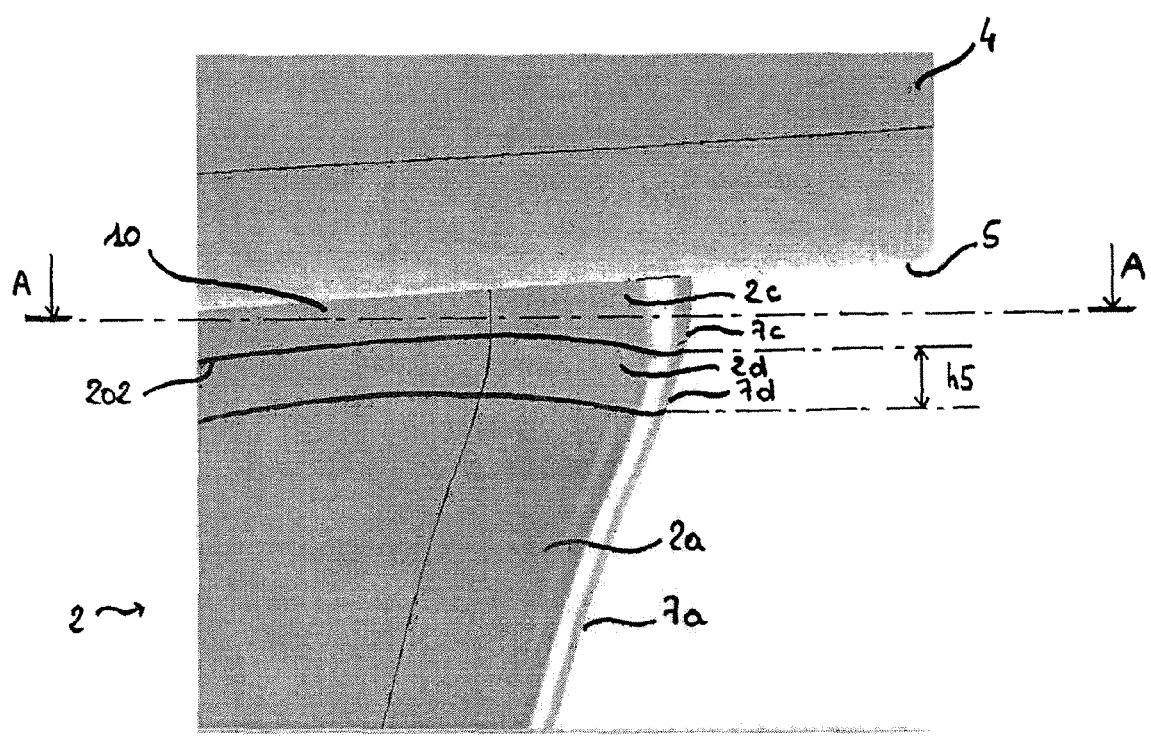
FIG. 5 is a detailed view of a stator according to the invention, viewed from the pressure face side.

FIG. 5 shows a detailed view, from the pressure face side, of the zone 20 of a vane 2 equipped with a reworking of shape in accordance with the invention.

According to the invention, the radially internal part 2a is made up of two zones, a first zone extending radially from the outer shroud, and a transition zone 2d of height h5, connecting the first zone to the intermediate part 2c. The height of the first zone is therefore equal to h4-h5.

In the first zone of the radially internal part 2a of the vane 2, the radius of curvature of the TE 7a, connecting the pressure face 8 to the suction face 9, is practically constant over the entire height h4.

In the transition zone 2d, the radius of curvature of the TE 7d is an evolving one. It increases progressively from a length identical to the radius 7a, to a length which may be three times the length of the radius 7a. This maximum is obtained at the cutting surface 202 and corresponds to a maximum beyond which the effect on the level and location of the excess stress is no longer significant. As a preference, this increase in the radius of curvature is linear.

In the intermediate part 2c of the vane 2, that is to say in the part situated between the cutting surface 202 and the internal face 5 of the outer shroud 4, the radius of curvature of the TE 7c is practically constant and equal to the radius of curvature 7d reached at the cutting surface 202.

This local reworking of the radius is therefore performed over a height corresponding to h5+h3, with h5 ranging between 0.5% and 2.5%, preferably representing 2.2%, of the total height of the vane h. Thus, the increase in radius of curvature at the TE has no effect on the aerodynamics of the vane.

Figure 6:
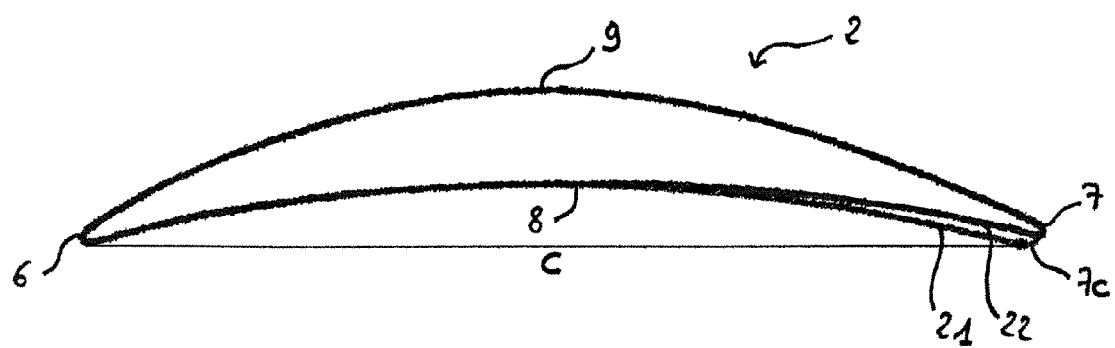
FIG. 6 is a view in cross section, on A-A, of a vane according to the invention.

FIG. 6 shows a view in cross section, on line A-A, through the tip 10 of a vane according to the invention. Depicted in superposition are a cross section corresponding to a vane with no reworking of the shape 22 and a cross section corresponding to a vane according to the invention 21. At the vane tip 10, and more specifically at its intermediate part 2c, the cross section with no reworking of the shape 22 has a radius of curvature at the TE 7 identical over the entire height h of the vane and of short length, namely of the order of 0.1 to 0.3 mm long. The cross section according to the invention 21, that is to say the one corresponding to a vane with the shape reworked at the TE on the pressure face, has a radius of curvature at the TE 7c that is increased by comparison with the initial cross section 22.

In addition, the increase in the radius of curvature at the TE is accompanied by an increase in the thickness of the vane. This increase may be achieved over the entire chord length C of the vane but in general only the downstream part of the cross section 21 has an increased thickness. The chord length C is the length of the line joining the leading edge and the trailing edge of the vane together, for a given cross section. As a preference, the part with its thickness increased represents at most one third of the chord length for a given cross section. The increase in thickness of the cross section is progressive so that no abrupt feature or protrusion disturbs the air flow along the pressure face.

Finally, in the connecting part 2b, the radius of curvature at the TE is the same, over the entire height h2, as the radius of curvature of the intermediate part 2c.

The impact that these geometric reworkings have, namely the impact of the increase in radius of curvature of the TE and the increase in vane thickness, is purely mechanical because these reworkings are very highly localized in terms of the height of the vane and length of chord affected. In addition, the thickening is done only on the pressure face of the vane. Thus, the aero-dynamic engineering of the vane is not jeopardized. Likewise, the direct environment of the vane is unaltered and manufacture is not significantly affected. Indeed, for example, when a casting method is used, the molds in which the molten metal is cast and which reproduce the shape of the vane do not need to be completely changed. Only a small modification to the existing molds, that is to say to molds used for manufacturing vanes that have no reworking of their shape, needs to be performed, and only very locally.

In spite of the fact that these modifications seem slight, their effect on the mechanical integrity of the stator section is great. For example, in the case of a stator section with the following vane characteristics:

vane height: 67 mm,
radius at the TE: 0.2 mm,
chord at the tip of the airfoil: 34.12 mm, after increasing the radius of the TE by 100% where the vane meets the internal surface of the outer shroud, the increase being performed linearly over 1.5 mm of vane height then keeping the increased radius over 0.8 mm of height, and after increasing the vane thickness, in the same zone, over one third of the chord length for each cross section considered, an approximately 50% reduction in the maximum stress in the brazed joint was observed, and the point at which the maximum stress was seen in the TE pressure face zone was shifted out of the region of the brazed joint.

The invention claimed is:

1. A turbomachine stator section comprising:
   an inner shroud;
   an outer shroud; and
   a stator vane connected to the inner shroud and the outer shroud, the stator vane comprising
   a radially internal part of height h4,
   a radially external part of height h1,
   a pressure face side,
   a suction face side,
   a leading edge, and
   a trailing edge,
   wherein the radially external part includes an intermediate part of height h3 and a connecting part of height h2 which meet, the intermediate part is positioned between the connecting part and the radially internal part,
   wherein the radially internal part of the vane comprises a first zone connected to the radially external part by a transition zone,
   wherein the vane is connected to the outer shroud only by the connecting part, the intermediate part is positioned radially inside the outer shroud, and
   wherein the trailing edge has a radius of curvature which connects the pressure face to the suction face, the radius of curvature increases progressively in the transition zone of the vane, the radius of curvature reaches a maximum where the transition zone and the intermediate part meet and remains constant at the maximum in the intermediate part and the connecting part.

2. The stator section as claimed in claim 1,
   wherein the radius of curvature of the trailing edge is constant in the first zone of the radially internal part of the vane.

3. The stator section as claimed in claim 1,
   wherein the radius of curvature of the trailing edge increases linearly in the transition zone of the vane.

4. The stator section as claimed in claim 1,
   wherein a thickness of the vane increases progressively in the transition zone on the pressure face side toward the trailing edge.

5. The stator section as claimed in claim 4,
   wherein the vane has a chord length C, and the progressive increase in the thickness of the vane in the intermediate part occurs over one third of the length of the chord.

6. The stator section as claimed in claim 1,
   wherein the radius of curvature of the trailing edge of the transition zone of the vane increases until the radius of curvature of the trailing edge is three times the radius of curvature of the trailing edge of the first zone of the radially internal part of the vane.

7. The stator section as claimed in claim 1,
   wherein the transition zone and the intermediate part of the vane is between 0.5 and 2.5% of a total height of the vane.

8. The stator section as claimed in claim 7, wherein the height h1 of the radially external part is between 5 and 10% of the total height of the vane.

9. The stator section as claimed in claim 7, wherein the height h2 of the connecting part is between 0.5 and 15% of the total height of the vane.

10. A compression stage comprising:
    a cascade of stator sections and a rotor disk equipped with rotor blades, the cascade of stator sections comprising at least one stator section as claimed in claim 1.

11. A compressor comprising at least one compression stage as claimed in claim 10.

12. A turbomachine comprising at least one compressor as claimed in claim 11.

* * * * *